(12) United States Patent
Hibi et al.

(10) Patent No.: US 10,130,204 B2
(45) Date of Patent: Nov. 20, 2018

(54) NOODLE-STEAMING METHOD AND NOODLE-STEAMING DEVICE

(71) Applicant: NISSIN FOODS HOLDINGS CO., LTD., Osaka (JP)

(72) Inventors: Takaaki Hibi, Osaka (JP); Yoshifumi Miyazaki, Osaka (JP); Kensuke Oe, Osaka (JP); Mitsuru Tanaka, Osaka (JP)

(73) Assignee: NISSIN FOODS HOLDINGS CO., LTD., Osaka (JP)

( * ) Notice: Subject to any disclaimer, the term of this patent is extended or adjusted under 35 U.S.C. 154(b) by 79 days.

(21) Appl. No.: 14/379,367

(22) PCT Filed: Feb. 19, 2013

(86) PCT No.: PCT/JP2013/054016
§ 371 (c)(1),
(2) Date: Aug. 18, 2014

(87) PCT Pub. No.: WO2013/125529
PCT Pub. Date: Aug. 29, 2013

(65) Prior Publication Data
US 2015/0017299 A1    Jan. 15, 2015

(30) Foreign Application Priority Data

Feb. 20, 2012 (JP) ................................. 2012-034134

(51) Int. Cl.
*A47J 27/04* (2006.01)
*A23L 5/10* (2016.01)
(Continued)

(52) U.S. Cl.
CPC ................. *A47J 27/04* (2013.01); *A23L 5/13* (2016.08); *A23L 7/109* (2016.08); *A23L 7/113* (2016.08);
(Continued)

(58) Field of Classification Search
CPC .......... A23L 1/0121; A23L 1/16; A23L 1/162; A47J 2027/006; A47J 2027/043; A47J 27/04
See application file for complete search history.

(56) References Cited

U.S. PATENT DOCUMENTS 4,830,866 A * 5/1989 Manser ..................... A23L 1/16
426/451
6,655,263 B2 * 12/2003 Sakurazawa .......... A23L 1/0121
99/330

(Continued)

FOREIGN PATENT DOCUMENTS

CN          1053996       8/1991
CN          1142910       2/1997
(Continued)

OTHER PUBLICATIONS

JP59102365translation.*
(Continued)

Primary Examiner — Erik Kashnikow
Assistant Examiner — Preston Smith
(74) Attorney, Agent, or Firm — Greenblum & Bernstein, P.L.C.

(57) ABSTRACT

A method of steaming a bunch of noodle strings using a noodle strings steaming device including a conveyer on which the bunch of noodle strings is placed after being cut out and that transports the bunch of noodle strings, and a tunnel type of body portion provided so that the bunch of noodle strings passes through the body portion with the transportation of the conveyer includes a process of carrying the cut-out bunch of noodle strings from an entrance portion of the body portion while transporting the cut-out bunch of noodle strings on the conveyer, steaming for a predetermined period of time by supplying steam to the bunch of noodle strings, steaming the bunch of noodle strings without (Continued)

supplying the steam, and then transporting the bunch of noodle strings to an exit portion, and a noodle strings steaming device performs the above method.

5 Claims, 16 Drawing Sheets

(51) Int. Cl.
 *A23L 7/109* (2016.01)
 *A23L 7/113* (2016.01)
 *A47J 27/00* (2006.01)

(52) U.S. Cl.
 CPC .... *A47J 2027/006* (2013.01); *A47J 2027/043* (2013.01)

(56) References Cited

U.S. PATENT DOCUMENTS

| 2011/0129582 | A1 | 6/2011 | Miyazaki et al. |
| 2013/0156909 | A1 | 6/2013 | Yum et al. |

FOREIGN PATENT DOCUMENTS

| CN | 1437447 | 8/2003 |
| CN | 1676026 | 10/2005 |
| JP | 53-9364 | 1/1978 |
| JP | 53-72873 | 6/1978 |
| JP | 58-190929 | 12/1983 |
| JP | 59-103620 | 6/1984 |
| JP | H10-276698 | 10/1998 |
| JP | 2001-299258 | 10/2001 |
| JP | 2002-51717 | 2/2002 |
| JP | 2002-253152 | 9/2002 |
| JP | 2003-159018 | 6/2003 |
| JP | 2003-204766 | 7/2003 |
| JP | 2010-17167 | 1/2010 |
| WO | 2011/013185 | 2/2011 |
| WO | 2012/002752 | 1/2012 |

OTHER PUBLICATIONS

Search report from PCT/JP2013/054016, dated May 14, 2013.
International Preliminary Report on Patentability dated Aug. 26, 2014.
Office Action issued in China Counterpart Patent Appl. No. 201380010285.0, dated Aug. 18, 2015.
Office Action issued in Korean Counterpart Patent Appl. No. 10-2014-7025789, dated Jun. 20, 2016.
Search Report issued by European patent office in European Patent Application No. 13751312.3, dated Sep. 22, 2015.

* cited by examiner

NOODLE-STEAMING METHOD AND NOODLE-STEAMING DEVICE

TECHNICAL FIELD

The present invention relates to a noodle strings steaming device and a method of steaming noodle strings. More specifically, the present invention relates to a noodle strings steaming device and a method of steaming noodle strings that are suitable for steaming of raw noodles.

BACKGROUND ART

Steamed noodles or instant noodles are produced in large amounts at high speeds. In a method of producing steamed noodles or instant noodles, generally, raw materials such as flour, buckwheat flour and starch are added, kneading water (prepared by dissolving salt, brine, thickening polysaccharides, etc.) is supplied, and kneading is performed to prepare a noodle paste known as a dough. Also, the prepared noodle paste (dough) is aged, prepared into a noodle sheet by a rolling mill, and then compounded. The noodle sheet after composition is rolled by a plurality of rolling mills, and the noodle sheet after rolling is cut out by a cutting blade roll, laminated on a conveyer, and transported.

Then, the bunch of noodle strings laminated on the conveyer passes through a tunnel type of steaming device to be steamed while being transported. The bunch of noodle strings after steaming is called steamed noodles. The steamed noodles are wrapped and distributed in a market. Further, the steamed noodles are subjected to seasoning or the like, and then moved to a drying process in which the steamed noodles are dried with oil heat or hot air, resulting in the instant noodle mass.

Here, in the process of steaming the raw noodles, a large amount of bunch of noodle strings may often be continuously processed using a tunnel type of steamer. In this process, a large amount of steam is necessary since it is necessary to steam bunch of noodle strings continuously at a high speed. Further, when the steam is insufficient in this steaming process, the steamed noodles themselves may taste undercooked. Further, even when the instant noodle mass is then completed by oil heat drying and hot air drying, the so-called undercooked taste remains when the instant noodle mass is cooked by pouring hot water and eaten. Thus, the steaming process has been a very important process in producing the steamed noodles or the instant noodles.

Therefore, an amount of steam used has been large, and much energy has been consumed in generation of this steam. Therefore, in the present steaming process, if the amount of used steam can be reduced by further increasing steaming efficiency and the energy can be used more efficiently, this can reduce a production cost and can be more friendly to the environment.

Generally, various prior application technologies are disclosed as methods of increasing steaming efficiency of noodles or the like in a tunnel type of steaming device. For example, the technologies include Patent Literatures 1 and 2 below.

CITATION LIST

Patent Literature

[Patent Literature 1] Japanese Patent Laid-Open No. 2010-17167

[Patent Literature 2] Japanese Patent Laid-Open No. 2002-51717

SUMMARY OF INVENTION

Technical Problem

These conventional technologies are all excellent inventions, and steaming is able to be efficiently performed according to Patent Literature 1 described above. However, it has been pointed out that a structure thereof is complicated. Further, in the method described in Patent Literature 2, it has been pointed out that precision is required since it is necessary to maintain sealing based on packing.

Therefore, the inventors set out to develop a method of steaming more efficiently in a steaming process when steamed noodles or instant noodles are produced.

Solution to Problem

It has been found from a result of various tests by the inventors that, in a tunnel type of steaming device for noodle strings used for production of steamed noodles or instant noodles, the same steaming efficiency as that of conventional steaming is obtained by performing a conventional steaming process up to the middle by supplying sufficient steam to the bunch of noodle strings carried into an entrance of the steaming device to perform steaming for a predetermined period of time, and then continuing transportation in the tunnel in a state in which the supply of the steam is stopped.

In other words, the noodle-steaming method according to one aspect is

"a method of steaming a bunch of noodle strings using a noodle strings steaming device including a conveyer on which the bunch of noodle strings is placed after being cut out and that transports the bunch of noodle strings, and a tunnel type of body portion provided so that the bunch of noodle strings passes through the body portion with the transportation of the conveyer, the method including:

"a process of carrying the cut-out bunch of noodle strings from an entrance portion of the body portion while transporting the cut-out bunch of noodle strings on the conveyer, steaming for a predetermined period of time by supplying steam to the bunch of noodle strings, steaming the bunch of noodle strings without supplying the steam, and then transporting the bunch of noodle strings to an exit portion."

The noodle-steaming method according to one aspect may be

"the noodle-steaming method including transporting the bunch of noodle strings on the conveyer to pass the bunch of noodle strings through a first portion provided on the entrance side of the body portion for supplying steam to the bunch of noodle strings to steam the bunch of noodle strings, and then to pass the bunch of noodle strings through a second portion provided on an exit side and continuous with the first portion for steaming the bunch of noodle strings without supplying the steam."

Next, it has been found that, when efficient steaming is performed using the above steaming method, the temperature is preferably maintained so that an internal temperature of a reservoir in the entrance portion of the body portion was 98° C. or more, and an internal temperature of the reservoir in the exit portion was also 98° C. or more. Thus, it is possible to more suitably perform the steaming process even when a conventional steaming device is used, by maintaining the temperature state of the entrance portion and the exit portion.

In other words, the noodle-steaming method according to one aspect may be

"the noodle-steaming method, wherein an internal temperature of the entrance portion of the body portion is 98° C. or more and an internal temperature of the exit portion is maintained at 98° C. or more."

Next, the present invention also provides a steaming device that can realize the above-described steaming method.

In other words, the noodle strings steaming device according to one aspect may be "a noodle strings steaming device including a conveyer on which a bunch of noodle strings is placed after being cut out and that transports the bunch of noodle strings, and a tunnel type of body portion provided so that the bunch of noodle strings passes through the body portion with the transportation of the conveyer, "wherein the body portion includes "a first portion provided on an entrance side for supplying steam to the bunch of noodle strings transported on the conveyer to steam the bunch of noodle strings; and "a second portion provided on the exit side and continuous with the first portion for steaming the bunch of noodle strings without supplying the steam."

Next, in the noodle strings steaming device, an exhaust device for absorbing a gas or the like to maintain the temperature of the entrance portion may be installed.

In other words, the noodle strings steaming device according to one aspect may be "the noodle strings steaming device including an entrance-side exhaust device installed on the entrance side of the body portion of the noodle strings steaming device."

Further, in the noodle strings steaming device, an exhaust device for absorbing a gas or the like to maintain a temperature of the exit portion may be installed.

In other words, the noodle strings steaming device according to one aspect may be "the noodle strings steaming device including an exit-side exhaust device installed on the exit side of the body portion of the noodle strings steaming device."

Further, a partition member may be provided at a border between the steam supply portion and the steam stop portion to prevent volatilization of the steam in the steam supply portion.

In other words, the noodle strings steaming device according to one aspect may be "the noodle strings steaming device including a partition member provided at a border between the first portion and the second portion."

Advantageous Effects of Invention

With the noodle-steaming method and the noodle strings steaming device according to the present invention, it is possible to perform steaming more efficiently in a steaming process when steamed noodles or instant noodles are produced.

DESCRIPTION OF EMBODIMENTS

Figure 1:
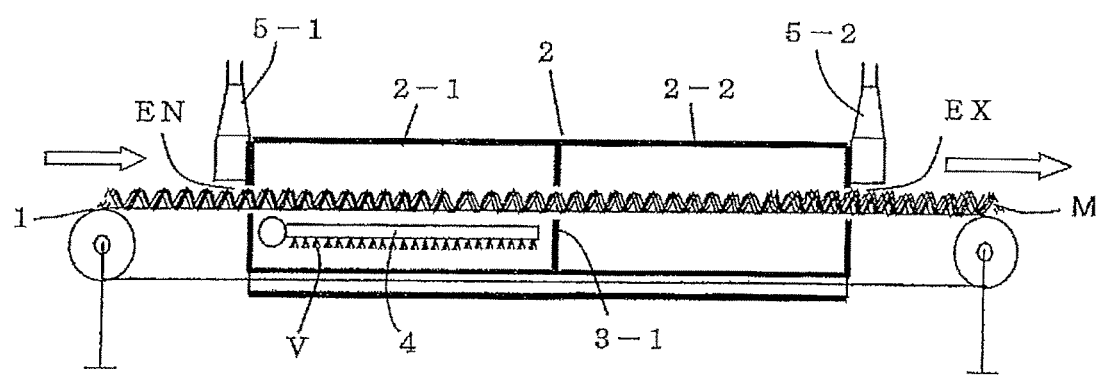
FIG. 1 is a schematic cross-sectional view of a first embodiment of a noodle strings steaming device of the present invention.

Hereinafter, embodiments of the present invention will be disclosed, but the present invention is not limited to the scope of the embodiments.

<Cut-Out Noodle Strings>

For raw noodle strings, raw materials such as flour and starch are put into a mixer, kneading water prepared in advance is supplied, and the raw material and the water are mixed. A paste taken out of the mixer is called a "dough." The dough is aged, changed into two noodle sheets by a rolling mill, and then compounded into one noodle sheet by the rolling mill.

The compounded noodle sheet has a thickness of 8 to 12 mm, but is sequentially rolled to a predetermined noodle sheet thickness by several sets of continuous rolling mills. The rolled noodle sheet passes through blades of a roll-shaped rotational cutting machine to be cut in noodle line shapes.

The noodle strings include noodles having substantially rectangular cross-sections, and noodle strings having circular cross-sections. Since a length of one side or a diameter of the noodle strings is at most about 1 to 2 mm, the noodle strings have an elongated linear shape.

Therefore, the noodle strings are heated to their centers in a relatively short time through heating with steam or the like from the outside. Further, since there are a plurality of convoluted noodle strings on the conveyer, the noodle strings easily hold steam, and a feature of the shape of the bunch of noodle strings is considered to contribute to realization of the present invention.

<Transport Conveyer>

The cut-out bunch of noodle strings is laminated on the conveyer and continuously carried by the conveyer. Further, various materials are selectable for a material of this conveyer. Specifically, the conveyer may include a net conveyer made of stainless steel or a conveyer made of rubber or resin. Generally, a net-shaped type is used.

<Tunnel Type of Bunch of Noodle Strings Steaming Device>

A tunnel type of noodle strings steaming device of the present invention includes a conveyer as described above, and a body portion of a steaming device installed with respect to this conveyer. The body portion of the steaming device is disposed so that the bunch of noodle strings is carried into a body of the steaming device as the conveyer travels. Raw noodle strings are inserted from an entrance side of the steaming device body portion and steamed therein. The bunch of noodle strings is steamed by steam spouted from a steam pipe or the like installed in an upper portion inside the body portion or under the conveyer while the conveyer moves inside the body portion. Further, the body portion has a box shape (or a cylindrical shape) extending in a transportation direction and having an internal space. The body portion includes a pair of end wall portions facing in the transportation direction. An entrance portion is configured of an opening formed in one end wall portion, and an exit portion is configured of an opening formed in the other end wall portion. A portion of the conveyer on which at least the bunch of noodle strings is placed extends from the entrance portion of the body portion to the exit portion through the internal space.

When the bunch of noodle strings comes out of the exit of the body portion with the transportation of the conveyer, steaming ends and the bunch of noodle strings is carried to a next process. Further, in the case of the tunnel type of steaming device, generally, the steam pipe is introduced from the outside and disposed inside the body portion.

Specifically, the steam pipe may be disposed below the conveyer or may be disposed above the conveyer. Further, for an arrangement of the steam pipe, a plurality of steam pipes may be disposed in parallel in a traveling direction of the conveyer or a plurality of steam pipes may be disposed in positions perpendicular to the traveling direction of the conveyer.

<Noodle Strings are Carried from the Entrance Portion and Steamed for a Predetermined Time>

In the present invention, steaming is performed for a certain period of time when the bunch of noodle strings is steamed, and then a process of transporting the bunch of noodle strings in a state in which supply of the steam is stopped is performed. In other words, steaming is performed by supplying the steam to the bunch of noodle strings for the certain period of time, and then the bunch of noodle strings is steamed without supply of the steam. Therefore, it is necessary to perform the steaming as in the case of normal steaming by carrying a bunch of noodle strings from the entrance portion. Further, "the bunch of noodle strings is steamed without supply of the steam" means that a sufficient amount of steam is supplied in a step of steaming by supplying steam, and thus steaming is performed using, for example, steam held by the bunch of noodle strings and steam carried with the transportation of the bunch of noodle strings without new supply of steam. "A state in which supply of the steam is stopped" includes, for example, a state in which an operation of the steam pipe provided in a position through which the bunch of noodle strings passes is stopped to stop the above supply, the steam pipe is not provided in the position through which the bunch of noodle strings passes, or a hole of the steam pipe is closed, so that the supply of the steam is stopped. In other words, "a state in which supply of the steam is stopped" may be any state in which the steam is not supplied to the bunch of noodle strings. Further, supply of the steam in such a manner that a spout direction of the spout port of the steam pipe is directed to the bunch of noodle strings corresponds to "the supply of the steam." In other words, the steam being weak after the spout of the steam pipe, flowing in a direction different from the spout direction, and, as a result, being supplied to the bunch of noodle strings in a place in which the steam has flowed does not correspond to "the supply of the steam" in the present embodiment.

When a conventional steaming device is used, steaming time for noodle strings usually is about 1 minute and 20 seconds (80 seconds) to 2 minutes and 30 seconds (150 seconds). The inventors found through study that the steaming process can be completed by performing steaming for about ¼ or more (about 20 seconds or more), and preferably about ⅓ or more (about 27 seconds or more), of the steaming time, and performing transportation to the exit in the state in which supply of the steam is stopped.

Further, when this steaming time is too short, the steaming becomes insufficient, and when steaming is performed for a long time, used steam to be used is not reduced. Further, the steaming time is changed according to a steam amount to be supplied or a thickness of the noodle strings.

<Temperature of the Entrance Portion>

In the present invention, it is preferable for the steam to be held in the entrance portion of the tunnel type of steaming device and maintained at a high temperature. In other words, since a distance from the entrance portion to the exit portion in the body portion of the steaming device is limited, it is preferable for supply of the steam from the entrance portion to be suitably performed in order to perform steaming efficiently.

Further, since it is desired to process a large amount of the noodle strings in a short time in steaming of the noodle strings on the conveyer, a speed of the conveyer is relatively fast at about 8 m/min. For example, since noodle strings are processed at a high speed in a line for instant noodles, the speed of the conveyer may be about 1.5 m/min to 12 m/min. Generally, a transportation speed of the noodle strings is similar.

At such a relatively high conveyer speed, the steam is carried in a traveling direction of the conveyer as the conveyer travels. Therefore, a steam density of the vicinity of the entrance portion of the body portion decreases, and an internal temperature of the reservoir of the entrance portion may also decrease. In the present invention, since steaming of the first half is processed in a short time and then transportation is performed in a state in which the steaming is stopped, it is necessary to efficiently perform the steaming of the first half in a short time.

Therefore, in such a case, a method of providing a duct in the vicinity of the entrance of the body portion (i.e., on the entrance side of the body portion) and exhausting, for example, a gas in the vicinity of the body portion entrance through the duct is effective. The duct in the present invention serves to increase steam density in the vicinity of the entrance portion and increase a temperature by pulling back the steam carried by the conveyer, as described above.

Thus, in the present invention, the steam density and the temperature are prevented from decreasing due to the movement of the steam as the conveyer travels, unlike a conventional duct.

Further, it is preferable for the temperature of the vicinity of the entrance portion of the body portion, i.e., on the inside side of the reservoir about 10 cm from the entrance portion, to be 98° C. or more through use of the duct. Further, the temperature is more preferably 99° C. or more.

<Supply of the Steam>

In the present invention, after the above-described supply of the steam, the supply of the steam is stopped and the bunch of noodle strings is transported to the exit portion. First, the steam is generally supplied from the steam pipe provided above or below the conveyer. Further, a plurality of holes are provided in the steam pipe and the steam is supplied by emitting the steam from the holes.

A direction or a method of an arrangement of the steam pipes is not particularly limited, but usually, a plurality of steam pipes are generally disposed in parallel or perpendicular to the traveling direction of the conveyer. In the present invention, since the supply of the steam from the entrance portion of the body portion is performed in the steam supply portion, that is, the first half portion (the steam supply portion) in the reservoir of the body portion, and the supply of the steam is stopped in the subsequent portion, the steam pipe may reach a portion in the reservoir of the body portion in which the supply of the steam from the entrance portion is stopped.

Further, even when the steam pipe reaches the exit portion of the body portion, the supply of the steam may also be stopped using a method such as closing a steam hole of the second half portion. Thus, since the same steaming state can be obtained by closing the steam hole of the second half portion as described above, such a method is also possible.

Further, it is not necessary for the steam pipe to be a long pipe over an entire length from the entrance portion of the body portion to the exit portion, and a plurality of short steam pipes may be intermittently installed in the traveling direction of the conveyer toward the traveling direction of the conveyer.

Further, when the steam supply is stopped, it is desirable for the body portion to be divided into a portion that supplies steam and a portion that performs transportation without supplying the steam using a partition. In other words, it is preferable to install a partition member such as a plate at a border between the steam supply portion (a first portion which steams the bunch of noodle strings by supplying steam to the bunch of noodle strings) and the steam stop portion (a second portion which steams the bunch of noodle strings without supplying the steam) such that the transportation of the conveyer is not disturbed. A degree of sealing of the steam supply portion is considered to be increased by providing the partition member in this way, and transportation of the steam to the steam stop portion can be minimized as necessary.

<Transportation in a State in which Supply of Steam is Stopped>

As described above, the supply of the steam is stopped in a state in which the sufficient steam is supplied in the steam supply portion of the first half and the steaming of the noodle strings is performed up to the middle, and then the noodle strings are transported in the body in a state in which the noodle strings are placed on the conveyer.

Since the steam is supplied to the bunch of noodle strings in the steam supply portion (the first half portion), decrease of the temperature does not occur immediately. Further, since the steam supplied in the first half portion in addition to the steam flowing naturally from the steam supply portion of the first half is carried with the transportation to the second half, the steam is carried to the vicinity of the exit portion with the transportation of the noodle strings and the conveyer.

For the bunch of noodle strings on the conveyer, an elongate string-like object has a convoluted and laminated form. Therefore, the mass of noodle strings has a form containing a number of spaces, unlike a normal mass object.

Since a steaming object laminated on the conveyer is a bunch of noodle strings in steaming of raw noodles, the bunch of noodle strings is considered to be influenced by a characteristic of such a case. The inventors inferred that a particular characteristic of the bunch of noodle strings on the conveyer could be used at the time of such steaming.

Further, the steam supplied in the steam supply portion of the first half is transported together with the conveyer and carried to the steam stop portion. In the steam stop portion, the steam moves with the movement of the bunch of noodle strings on the conveyer holding the steam supplied in the steam supply portion, and the conveyer. However, since the supply of the steam is not performed in the steam stop portion, the steam may be volatilized without arriving at the vicinity of the exit.

Therefore, in this case, a method of providing an exhaust device duct in the vicinity of the exit of the body portion (i.e., on the exit side of the body portion) and exhausting gas or the like in the vicinity of the body portion exit through the duct is effective. The duct on the exit side in the present invention is intended to increase steam density in the vicinity of the exit portion to increase the temperature by attracting the steam transported with the conveyer to the exit side, as described above.

Further, it is preferable for the temperature of the vicinity of the exit portion of the body portion, for example, a place on the body side about 10 cm from the exit portion, to be 98° C. or more due to the use of the exhaust duct. Further, the temperature is more preferably 99° C. or more.

Further, the temperature of the entrance portion and the exit portion described above is assumed to substantially be the temperature of the vicinity of the bunch of noodle strings when the steaming of the bunch of noodle strings starts or ends.

Therefore, for example, in the case of the exit portion, if a type in which the exhaust device (duct) installed in the exit portion is deeply inserted from the tunnel exit portion of the body portion to the inside to exhaust a gas is adopted, the internal temperature of the vicinity of the tunnel exit portion may formally be less than 98° C.

However, since the steaming of the bunch of noodle strings actually ends, this temperature is assumed not to be an internal temperature of the exit portion in the present invention, but to refer to a temperature of a distal end portion into which the exhaust device (duct) is inserted, that is, the vicinity of the bunch of noodle strings when the steaming of the noodle strings substantially ends.

The method of steaming a bunch of noodle strings in the present invention has been described above. Hereinafter, an example of a steaming device of the present invention will be described.

The present invention is not limited to the scope of the method and the device. For content of the present invention, embodiments will be described with reference to the drawings.

FIG. 1 is a schematic cross-sectional view of a first embodiment of the noodle strings steaming device of the present invention. The steaming device of the first embodiment includes a conveyer 1 on which a bunch of noodle strings M is placed after being cut out and that transports the bunch of noodle strings M, and a tunnel type of body portion 2, as illustrated in FIG. 1. Further, the inside of the main body portion is divided into a steam supply portion 2-1 and a steam stop portion 2-2 by a partition member 3-1, and a steam pipe 4 is provided only in the steam supply portion 2-1.

Further, a first exhaust device (duct) 5-1 is disposed in an entrance portion of the body portion 2, and a second exhaust device (duct) 5-2 is disposed in an exit portion thereof. Further, the transportation conveyer 1 is configured to pass through the body portion 2.

<Bunch of Noodle Strings>

The bunch of noodle strings M is cut out in a process before the present process and transported on the conveyer 1 in a long line-shaped state as a bunch M of a plurality of noodle strings. The bunch of noodle strings M has a convoluted state on the conveyer and has a predetermined thickness. Further, the present invention can be used even when the convoluted state of the bunch of noodle strings M is either of a so-called waved or non-waved state.

<Conveyer on which the Noodle Strings are Placed and that Transports the Noodle Strings>

The noodle strings cut out in the above process are laminated and transported on the conveyer. The transportation conveyer 1 includes a conveyer belt and a sprocket, but a type thereof or the like is not particularly limited. Further, the conveyer belt may be of a general type or a net conveyer made of stainless steel, and a conveyer made of rubber or resin may be included. Generally, a net-shaped type is used. Further, the speed of the conveyer varies according to needs of production, but generally ranges from 1.5 m/min to 12 m/min.

<Steam Supply Portion>

The body portion 2 is configured so that the conveyer belt of the conveyer passes through the body portion 2. Further, in the present embodiment, a structure in which the steam pipe 4 is installed under the conveyer and holes are provided in a lower portion of the steam pipe 4 to spout the steam is adopted in the steam supply portion.

Further, the body portion 2 is divided into the steam supply portion 2-1 and the steam stop portion 2-2 from the entrance EN of the body portion 2 to the exit in a traveling direction of the conveyer 1. Further, a partition member 3-1 is provided at a border of the steam supply portion 2-1 and the steam stop portion 2-2 to the extent that the partition member 3-1 does not disturb transportation of the bunch of noodle strings M by the conveyer 1.

Further, a supply amount of the steam V changes with a size of the body portion 2, a speed of the conveyer 1 and an external environment. For example, when a scale of the body portion 2 is large, the internal temperature and the steaming state can often be maintained even when a steam supply amount per volume in the reservoir of the body portion 2 is relatively small.

<Partition Member>

The partition member 3-1 divides the steam supply portion 2-1 described above and the steam stop portion 2-2 to be described below, and serves to control outflow of the steam V supplied from the steam supply portion 2-1 into the steam stop portion 2-2. Accordingly, the partition member 3-1 is disposed so that the steam V in the steam supply portion 2-1 of the first half portion can be prevented from excessively flowing to the steam stop portion 2-2 of the second half portion and efficient steaming can be realized. A through-hole set to have such a size that the transportation portion of the conveyer 1 and the bunch of noodle strings M on the transportation portion can pass therethrough is formed in the partition member 3-1. The partition member 3-1 partitions the steam supply portion 2-1 and the steam stop portion 2-2 in the portion other than the through-hole.

Even when this partition member 3-1 is provided, the steam V supplied to the bunch of noodle strings in the steam supply portion 2-1 is transported to the steam stop portion 2-2 of the second half portion as the bunch of noodle strings M travels. Therefore, there is also the steam V transported from the opening of the partition member 3-1 to the steam stop portion 2-2.

Further, when the steam flow amount supplied in the steam supply portion 2-1, the volume of the steam supply portion 2-1 and its cross-sectional area in a conveyer direction are small, it may be unnecessary to provide the partition member 3-1. Further, when the volume of the steam stop portion 2-2 or its cross-sectional area in the conveyer direction is small, it may be unnecessary to provide the partition member 3-1.

Figure 15:
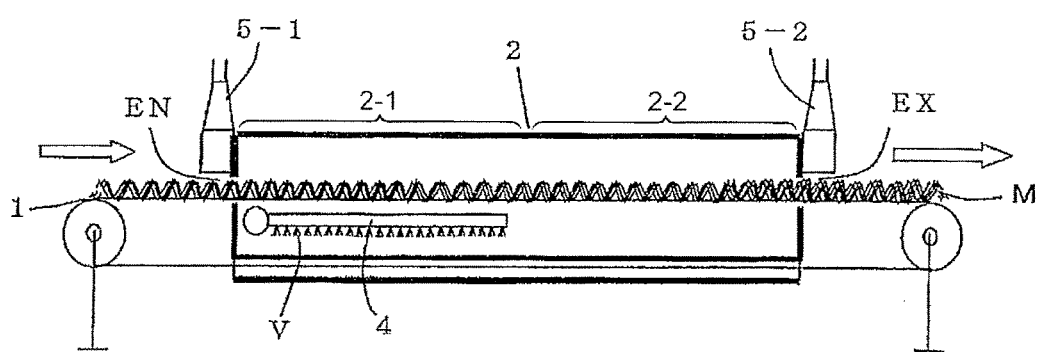
FIG. 15 is a schematic cross-sectional view of a noodle strings steaming device according to a variant of the present invention.

For example, the partition member 3-1 may not be provided between the steam supply portion 2-1 and the steam stop portion 2-2, as in an embodiment illustrated in FIG. 15. Accordingly, a configuration in which a space constituting the steam supply portion 2-1 and a space constituting the steam stop portion 2-2 continue with the same size may be adopted (when the partition member 3-1 is provided, the space itself continues, but is locally narrowed in a portion of the through-hole of the partition member 3-1). Further, when the partition member 3-1 is omitted, an area in which simmering is performed by supplying steam to the bunch of noodle strings M, that is, an area in which the steam pipe 4 is disposed and the steam is supplied from the steam pipe 4 in the area in the transportation direction of the body portion 2, corresponds to the steam supply portion 2-1. Further, an area in which simmering is performed without supplying the steam to the bunch of noodle strings M, that is, an area in which the steam pipe 4 is not disposed or an area in which the steam is not supplied even when the steam pipe 4 is disposed in the area in the transportation direction of the body portion 2, corresponds to the steam stop portion 2-2.

<Steam Stop Portion>

The steam stop portion is configured so that the bunch of noodle strings M on the conveyer passing through the partition member 3-1 can pass therethrough. In the present embodiment, since the supply of the steam V is not performed, the steam pipe 4 as installed in the steam supply portion 2-1 is not provided.

Further, it is understood that, even when the steam pipe 4 is provided, the same effect can be obtained if the supply of the steam by the steam pipe 4 is stopped or the hole of the steam pipe 4 is closed.

Figure 16:
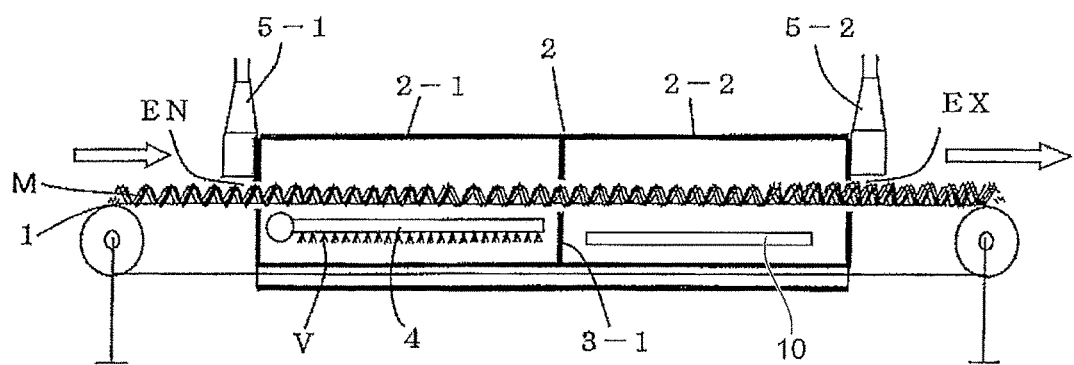
FIG. 16 is a schematic cross-sectional view of the noodle strings steaming device according to the variant of the present invention.

Further, a dummy member 10 may be disposed in place of the steam pipe 4 in the internal space of the steam stop portion 2-2, as illustrated in FIG. 16.

Further, an area downstream from the exit portion of the body portion 2, that is, an area on an outer side of the body portion 2, does not correspond to the steam stop portion 2-2. This is because the area on the outer side of the body portion 2 is a space exposed to air, and thus the steam held in the bunch of noodle strings M on the conveyer 1 and the steam remaining around the bunch of noodle strings M escape into the air. In this portion, no steaming of the bunch of noodle strings M is performed. On the other hand, in the present embodiment, in the steam stop portion 2-2, the conveyer 1 and the bunch of noodle strings M are surrounded by a wall portion of the body portion 2. Therefore, in this configuration, the steam stop portion 2-2 is full of steam. Accordingly, the steam easily remains around and inside the bunch of noodle strings M, and steaming of the bunch of noodle strings M is performed.

In the portion that transports the bunch of noodle strings M in the conveyer 1 in the steam stop portion 2-2, at least an upper side, a lower side, and a lateral side in the transportation direction may be covered with wall surfaces. Further, the wall surfaces are connected without a gap (although a small gap may be formed as long as the effects of the present invention can be achieved). A cross-sectional shape of the wall surface is not particularly limited and may be rectangular, polygonal, or circular. Further, in the steam stop portion 2-1, an upstream side (the entrance side) in the transportation direction may be divided by a wall surface (a wall surface including a partition member), and a downstream side (the exit side) may be divided by a wall surface (a partition member, or a wall surface by an outer wall on the exit side of the body portion 2).

Further, the ratio of the volume of the steam supply portion 2-1 and the steam stop portion 2-2 described above is not particularly limited, but is a ratio of a period of time for which the steam is supplied to perform steaming and a period of time for which the supply of steaming is stopped and only the transportation is performed. Generally, steam supply portion:steam stop portion=1:4 to 4:1.

For example, the ratio of the volume of the steam stop portion 2-2 to the volume of the steam supply portion 2-1 may be ¼ or more, ⅓ or more, ½ or more, ⅔ or more, or ¾ or more. Use of this range allows a sufficient period of time to be secured to steam the bunch of noodle strings M without supply of the steam. Further, the volume of the steam stop portion 2-2 may be 4 times or less, 3 times or less, twice or less, or 1.5 times or less that of the steam supply portion 2-1. Use of this range allows the steam in the vicinity of the noodle strings to reliably steam the bunch of noodle strings M without spreading. Further, a size in the transportation direction of the steam stop portion 2-2 may be greater than a distance between the steam pipe 4 in the steam supply portion 2-1 and the wall surface on the entrance side of the body portion 2, and may be greater than a distance between the steam pipe 4 in the steam supply portion 2-1 and the partition member 3-1. Further, a size in the transportation direction of the steam stop portion 2-2 may be greater than a size in a vertical direction of the steam stop portion 2-2 or may be greater than a size in a lateral direction of the steam stop portion 2-2.

Further, the steam stop portion 2-2 need not be in a state in which the bunch of noodle strings M are steamed without supplying the steam in the entire area of the steam stop portion 2-2. For example, the steam inside or around the bunch of noodle strings M is scattered near the exit portion and no substantial steaming may be performed (however, steaming is sufficiently performed upstream from the steam stop portion 2-2, and steaming necessary for the bunch of noodle strings M is completed near the exit portion.)

<First Exhaust Device (Duct) (Entrance-Side Duct)>

In the present embodiment, the duct 5-1 of the first exhaust device is installed on the entrance side. A gas in the vicinity of the entrance portion is absorbed by this duct 5-1.

Since the steam V supplied together with the bunch of noodle strings M due to transportation of the noodle strings by the transportation conveyer 1 is carried as described above, steam density in the vicinity of the entrance portion may be reduced and a decrease in the temperature may occur.

Therefore, a gas or the like near the entrance portion is absorbed by the first duct 5-1. Accordingly, the steam V carried in the traveling direction of the conveyer 1 is returned to the entrance portion, so that the steam density in the entrance portion can increase and the temperature can be maintained without being decreased.

The exhaust device is often equipped in a conventional steaming device, but a purpose thereof is to prevent the steam from scattering from the steaming device to the outside in order to maintain an internal environment of a factory. On the other hand, the purpose of using the first exhaust device 5-1 in the present invention is different from that of a normal steaming device. The inventors found through intensive study that the use of such an exhaust device greatly improves steaming efficiency itself when the bunch of noodle strings M are steamed.

In other words, when a laminate of the bunch of noodle strings M on the conveyer is steamed as in the present invention, the steam V moves as the conveyer 1 travels. However, when a method of dividing the steaming device into the first half portion and the second half portion and performing transportation while maintaining a steam atmosphere without supplying the steam in the second half portion is adopted as in the present invention, movement of the steam from the first half portion to the second half portion occurs since there is no supply of the steam in the second half portion.

Therefore, movement of more steam than that in a usual case as the conveyer travels in the entrance portion EN is remarkable. Therefore, securing of the steam and maintenance of the temperature in the entrance portion EN are very important. In other words, the presence of the exhaust device (duct) 5-1 in the entrance portion becomes important.

Further, in the phenomenon described above, the problem of the temperature decrease of the entrance portion EN becomes small if a traveling speed of the conveyer 1 is low. In the case of a steaming device usually used in a production line for instant noodles, the noodle strings are transported at a speed of about 1.5 m/min to 12 m/min in consideration of a production speed.

If the speed of the conveyer 1 increases, an amount of movement of the steam V as the conveyer 1 travels tends to further increase and the temperature and the steam atmosphere of the entrance portion tend to decrease.

When the bunch of noodle strings M is transported at a high speed by the conveyer 1, retention of the steam V moves in the traveling direction as the conveyer 1 travels. Therefore, since the steam V near the entrance portion of the body portion 2 is taken into the inside, air comes into the vicinity of the entrance and thus the temperature of the vicinity of the entrance portion decreases. This causes a problem in that steaming in that portion is insufficient.

Since the present invention intends to perform efficient steaming of the bunch of noodle strings M that is a steaming target, it is necessary to perform efficient steaming in the steam supply portion. Thus, a method of increasing the density and the temperature of the steam near the entrance by absorbing the steam V in the tunnel type of steaming device through which the noodle strings on the conveyer pass is effective in the present invention.

<Second Exhaust Device (Duct) (Exit-Side Duct)>

In the present embodiment, the second exhaust device (duct) 5-2 is provided in the exit portion EX. The second duct 5-2 on the exit side in the present invention is provided to increase steam density near the exit portion to increase the temperature by attracting the steam transported together with the conveyer to the exit, as described above.

There is a difference in that scattering of steam from the steaming device to the outside is prevented to maintain an environment of a factory, which is a purpose of the exhaust device (duct) in the conventional steaming device. Further, it is preferable for the temperature of the vicinity of the exit portion EX of the body portion 2, for example, a place on the body side about 10 cm from the exit portion, to be 98° C. or more due to the use of the second exhaust device (duct) 5-2. Further, the temperature is more preferably 99° C. or more.

It is possible to increase steaming efficiency by increasing the temperature up to the vicinity of the exit portion. It is also possible to minimize a length of the body portion and use the space effectively.

<Processing of the Noodle Strings Passing Through the Exit>

The steaming of the noodle strings passing through the exit portion of the body portion is completed. The noodle strings can be wrapped directly or wrapped after water, oil or the like is added thereto, and then sold as steamed noodle strings. Further, the bunch of noodle strings after steaming can be pulled, subjected to a process such as immersion into a seasoning liquid, and cut. The cut bunch of noodle strings can be subjected to oil heat drying or hot air drying, resulting in instant noodles.

Second Embodiment

Figure 2:
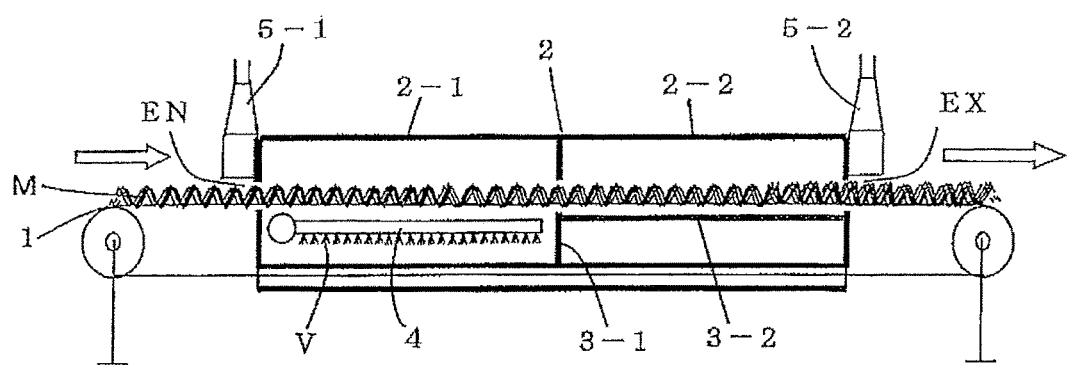
FIG. 2 is a schematic cross-sectional view of a second embodiment of the noodle strings steaming device of the present invention.

Next, a second embodiment of the present invention will be described below. FIG. 2 illustrates the second embodiment of the present invention. A basic configuration is the same as that of the first embodiment, but in the second embodiment, a volume of the body portion 2 in the steam stop portion 2-2 is smaller than that in the steam supply portion 2-1. Accordingly, the steam carried through the partition portion is efficiently used while volatilization of the steam from the transported bunch of noodle strings is suppressed.

Specifically, a downward partition member 3-2 is fitted under the conveyer in the steam stop portion EX to reduce an internal volume of a reservoir of a space under the downward partition member 3-2. In the second embodiment, the steam stop portion has a cross-sectional area in the traveling direction of the conveyer about 40% smaller than that of the steam supply portion. Accordingly, the steam transported as the conveyer travels from the steam supply portion 2-1, which is the first half portion, or steam leaking through the partition member 3-1 can be used efficiently.

Third Embodiment

Figure 3:
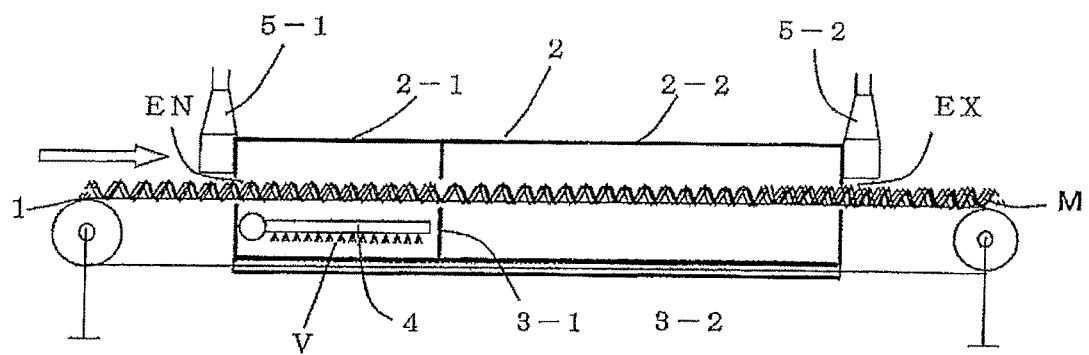
FIG. 3 is a schematic cross-sectional view of a third embodiment of the noodle strings steaming device of the present invention.

Next, a third embodiment of the present invention will be described below. FIG. 3 illustrates the third embodiment of the present invention. A basic configuration is the same as that of the first embodiment, but in the third embodiment, a ratio of sizes of the steam supply portion 2-1 and the steam stop portion 2-2 is changed to decrease the size of the steam stop portion 2-2.

Figure 4:
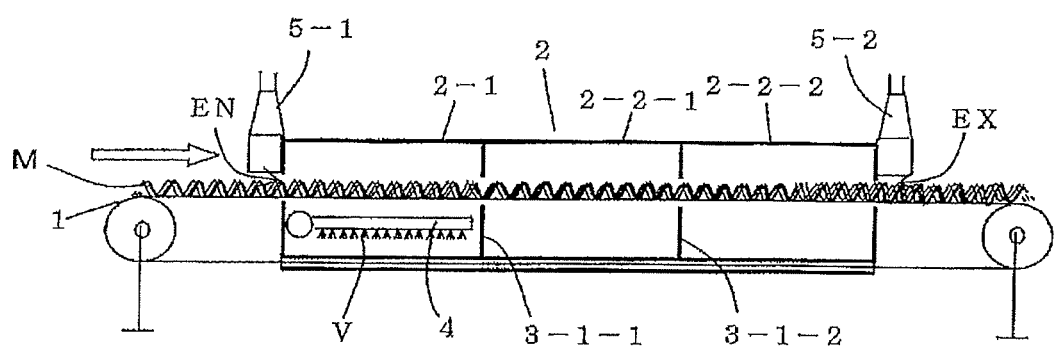
FIG. 4 is a schematic cross-sectional view of a modification type of the third embodiment of the noodle strings steaming device of the present invention.

Further, when the steam stop portion 2-2 is larger, only the first partition member 3-1 may be provided, as shown in the present embodiment. However, from a point of view of further preventing volatilization of the steam from the inside of the body portion, a second partition member 3-1-2 may be provided, as illustrated in FIG. 4. Further, another partition member may be provided.

Figure 5:
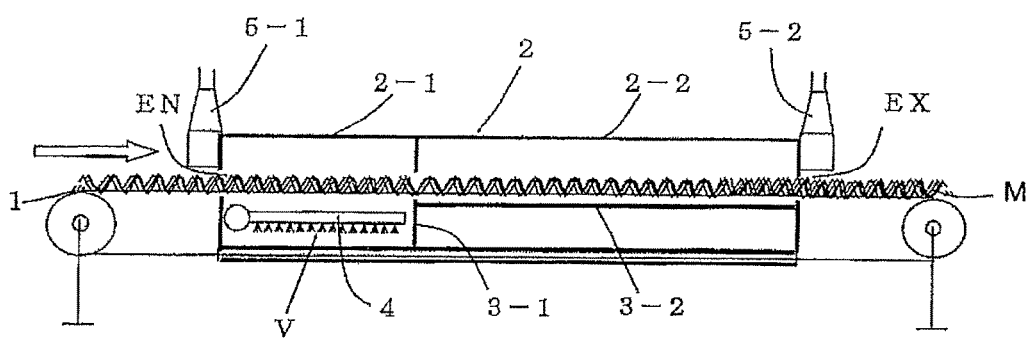
FIG. 5 is a schematic cross-sectional view of a second modification type of the third embodiment of the noodle strings steaming device of the present invention.

Further, in the present embodiment, a lower partition member is provided under the steam stop portion 2-2 to decrease a volume as illustrated in FIG. 5, so that the steam can be efficiently used.

Fourth Embodiment

Figure 6:
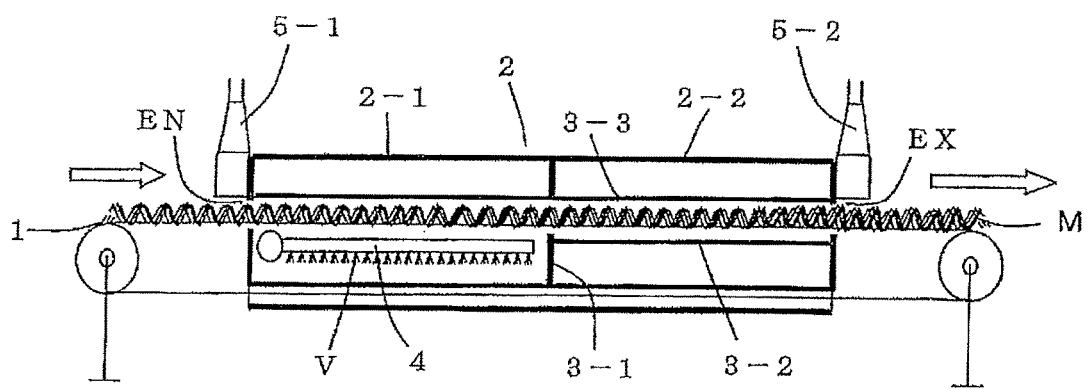
FIG. 6 is a schematic cross-sectional view of a fourth embodiment of the noodle strings steaming device of the present invention.

In a fourth embodiment, a case in which volumes of both of the steam supply portion 2-1 and the steam stop portion 2-2 are reduced is shown, as illustrated in FIG. 6 below. In the present embodiment, a lower partition member 3-2 and an upper partition member 3-3 are both provided. Thus, the volumes of both of the steam supply portion 2-1 and the steam stop portion 2-2 are reduced so that steaming can be more efficient.

Fifth Embodiment

Figure 7:
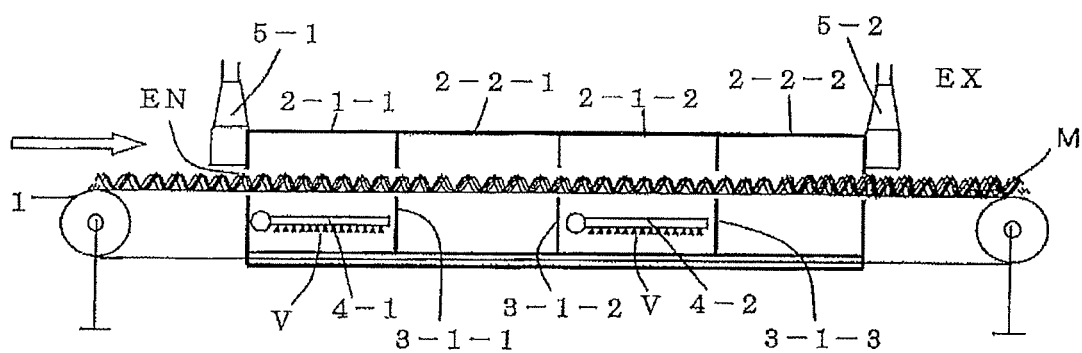
FIG. 7 is a schematic cross-sectional view of a fifth embodiment of the noodle strings steaming device of the present invention.

Next, a fifth embodiment of the present invention will be described below. FIG. 7 illustrates the fifth embodiment of the present invention. In the present embodiment, steam supply portion 2-1-1→steam stop portion 2-2-1 steam supply portion 2-1-2→steam stop portion 2-2-2 are connected.

In the present embodiment, it is possible to prevent reduction of the steam in an intermediate portion by repeatedly providing such portions. In the present embodiment, a portion of "steam supply portion→steam stop portion→steam supply portion" from the entrance side may be considered to be one steam supply portion. Further, it is understood that the number of times of "steam supply→steam stop" may increase.

EXAMPLES

Hereinafter, test examples in the present invention will be described. The present invention is not limited to these test examples.

<Test Example 1> (When the Inside of the Reservoir of the Body Portion is Divided in Two)

In an embodiment of the present invention, the inside of the body portion (having a total length of about 4 m and an internal cross-sectional area of about 0.06 m$^2$, and including a steam pipe corresponding to each of first and second half portions) of the conventional tunnel type of steaming device was divided into two equal portions, a first half portion was used as a steam supply portion, and a second half portion was used as a steam stop portion to perform a test.

Further, a partition portion was provided between the first half portion and the second half portion, and a ratio of an opening of the partition area of the partition portion to the internal cross-sectional area (a ratio of the opening to the cross-sectional area) was about 38%.

In the test, the speed of the conveyer passing through the inside of the steam reservoir was 1.6 m/min, and a period of time taken for the noodle strings to enter the entrance portion of the body portion and come out of the exit portion was 2 minutes and 30 seconds.

For the bunch of noodle strings supplied for the test, 900 g of flour and 100 g of starch were mixed, and 2.28 g of brine water and 340 g of water were put into the mixture to prepare a dough. After the dough was compounded, rolling was repeatedly performed a plurality of times to prepare a noodle sheet having a thickness of 0.75 mm. The noodle sheet after processing was cut into noodle strings using a cutting blade device (1.5 mm in width) with an angle blade No. 20, placed on the conveyer, transported, and subjected to a steaming process of the body portion.

Figure 8:
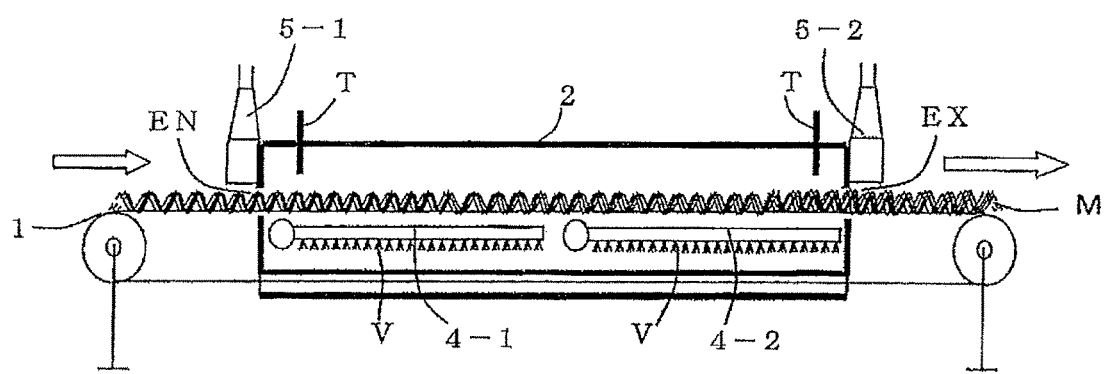
FIG. 8 is a schematic cross-sectional view of a conventional noodle strings steaming device.

For a steam flow amount, steam supply was performed with a flow amount of 120 kg/h in the first half portion and the second half portion without providing the partition member for a conventional method (Conventional example 1), as illustrated in FIG. 8.

Figure 9:
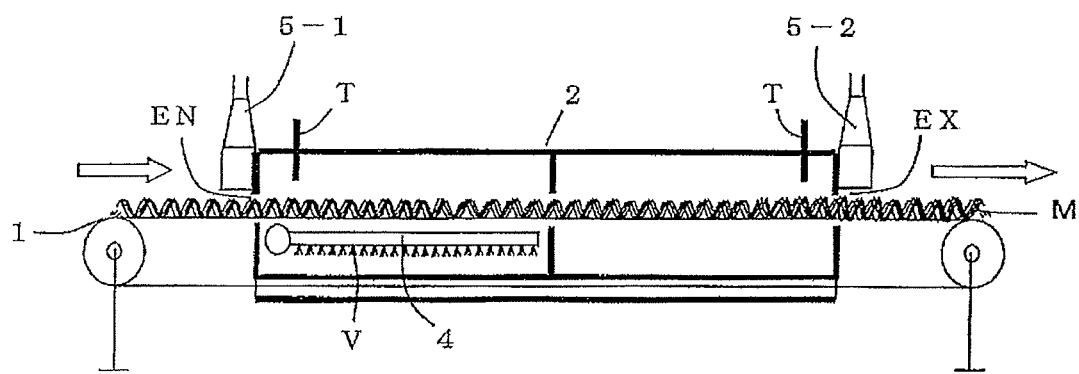
FIG. 9 is a schematic cross-sectional view of a noodle strings steaming device used in Example 1 of Test example 1.

Next, in Example 1, a partition member was provided in an intermediate portion, a first half portion was used as a steam supply portion, and steam supply of 120 kg/h was performed as in the conventional case, as illustrated in FIG. 9. The supply of the steam was stopped in the steam stop portion of the second half portion.

Figure 10:
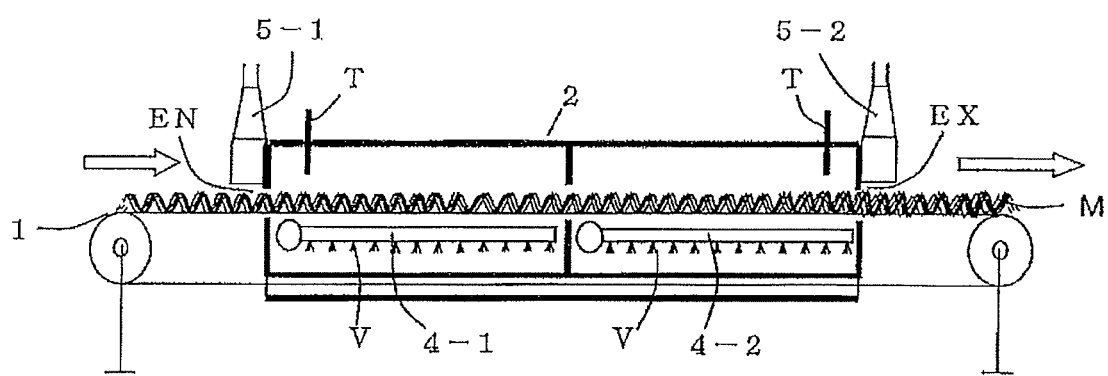
FIG. 10 is a schematic cross-sectional view of a noodle strings steaming device used in Comparative example 1 of Test example 1.

Further, in Comparative example 1, a partition member was provided in an intermediate portion as illustrated in FIG. 10, and steam supply of 60 kg/h which is a half of 120 kg/h of the steam flow amount in the first half portion of Example 1 was performed in the first half portion and the second half portion.

In Example 1, an amount of air of the duct was adjusted so that temperatures indicated by a thermometer (for measurement of a temperature of a space on the noodle strings inside the reservoir) provided in the reservoir 10 cm from the entrance portion and a thermometer (for measurement of a temperature of a space on the noodle strings inside the reservoir) provided in the reservoir 10 cm from the exit portion were 98° C. or more. However, in Comparative example 1, the temperature increased only to 97° C. or less even after the duct was adjusted.

Some of the noodle strings after the steaming process under the respective conditions of Conventional example 1, Example 1, and Comparative example 1 described above were collected, and a degree of gelatinization of the noodle strings was measured at the same time. Also, the noodle strings were immersed in a seasoning liquid and cut at 30 cm. 105 g of the noodle strings was received in a frying retainer and the retainer was immersed in frying oil (palm oil) at 150° C. for 2 minutes and 30 seconds to perform a frying process and complete an instant noodle mass. The obtained instant noodle mass was put in a bowl-shaped container, and 450 g of boiling water was poured into the container, which was closed with a cap for 3 minutes, and then the noodle strings were tasted.

Tasting was performed by five skilled engineers. The noodle strings steamed under the conventional steaming conditions (Conventional example 1) were used for control, and intensity of steaming thereof was compared. The results are shown in Table 1.

TABLE 1

| | Amount of flow (kg/h) | | | | |
| --- | --- | --- | --- | --- | --- |
| | First half portion | Second half portion | Partition member | degree of gelatinization | Tasting result |
| Conventional Example 1 | 120 | 120 | Absent | 66% | Good |
| Example 1 | 120 | — | Present | 66% | Good |
| Comparative example 1 | 60 | 60 | Present | 47% | Undercooked |

The same degree of gelatinization and tasting evaluation were obtained in the case of steaming of only the first half portion as in Example 1 in comparison with the case in which steaming was similarly performed in the first half portion and the second half portion, as in Conventional example 1. This result shows that the amount of steam can be greatly reduced in comparison with a conventional steam flow amount.

Meanwhile, in the case in which steam supply of 60 kg/h which is a half of 120 kg/h of the steam flow amount in the first half portion of Example 1 was performed in the first half portion and the second half portion even when the flow amount was the same as that in Example 1, the degree of gelatinization and the tasting evaluation did not reach those in Example 1, and the undercooked taste remained in the texture, as shown in Comparative example 1.

<Test Example 2> (when the Reservoir of the Body Portion is Divided in Three)

In an embodiment of the present invention, a test was performed using the tunnel type steaming device larger than that used in Test example 1. Further, the body portion of the tested steaming device had a total length of about 18 m and an internal cross-sectional area of about 0.27 $m^2$, and included steam pipes corresponding to a first half portion, an intermediate portion and a second half portion. The inside of the body portion was divided into three uniform portions. Only the first half portion or the first half portion and the intermediate portion were used as a steam supply portion, and only the second half portion or the second half portion and the intermediate portion were used as a steam stop portion to perform the test.

Further, partition members are provided between the first half portion and the intermediate portion and between the intermediate portion and the second half portion, and a ratio of an opening of a partition area of the partition member to the internal cross-sectional area (a ratio of the opening to the cross-sectional area) was about 27%.

The speed of the conveyer passing through a steam reservoir was 8 m/min for a test, and time taken for noodle strings to enter the entrance portion of the body portion and then exit the exit portion was 2 minutes and 15 seconds.

For the bunch of noodle strings supplied for the test, 900 g of flour and 100 g of starch were mixed and 2.28 g of brine water and 340 g of water were put into the mixture to prepare a dough. The dough was compounded and rolling was repeatedly performed a plurality of times to prepare a noodle sheet having a thickness of 0.75 mm. The noodle sheet after processing was cut into noodle strings using a cutting blade device (1.5 mm in width) with an angle blade No. 20, placed on the conveyer, transported, and subjected to a steaming process of the body portion.

Figure 11:
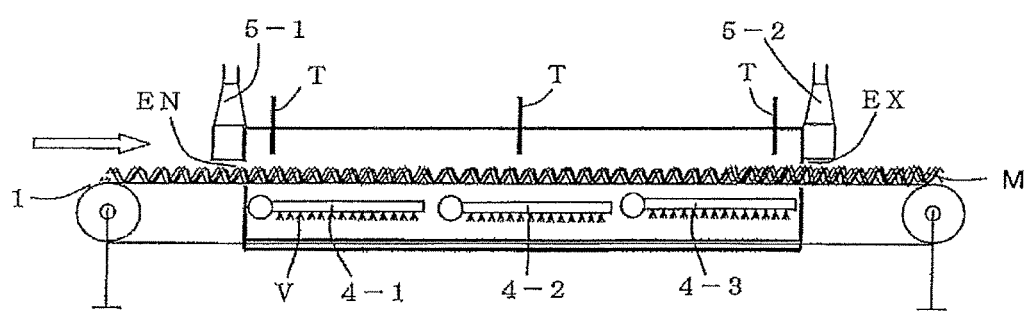
FIG. 11 is a schematic cross-sectional view of a conventional noodle strings steaming device.

For a steam flow amount, in the conventional method (Conventional example 2), supply of the steam to the first half portion, the intermediate portion, and the second half portion was performed with a flow amount of 400 kg/h without providing the partition member as illustrated in FIG. 11.

Figure 12:
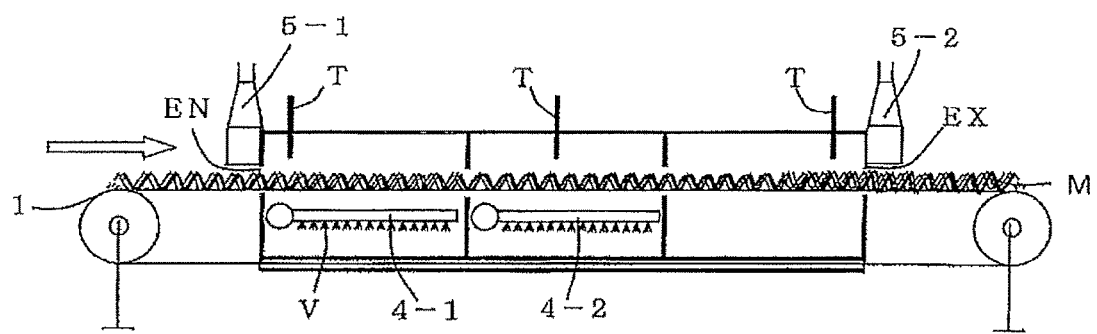
FIG. 12 is a schematic cross-sectional view of a noodle strings steaming device used in Example 2 of Test example 2.

Next, in Example 2, as illustrated in FIG. 12, a partition member was provided between the first half portion and the intermediate portion and between the intermediate portion and the second half portion, the first half portion and the intermediate portion were steam supply portions, and steam supply of 400 kg/h was performed in each portion, as in the conventional case. The supply of the steam was stopped in the steam stop portion of the second half portion.

Figure 13:
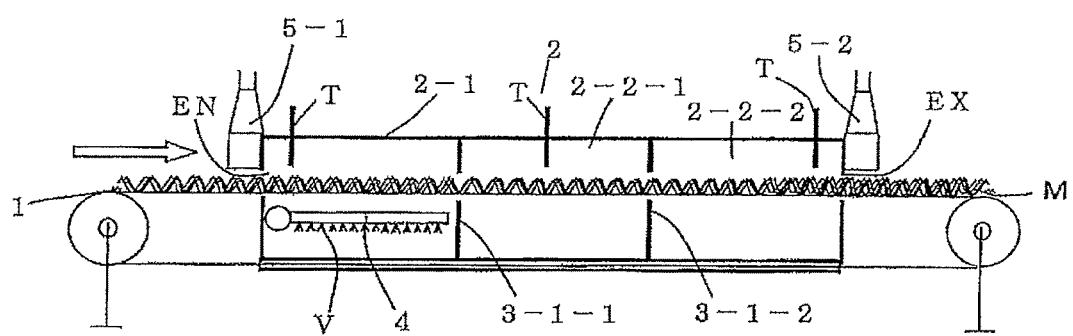
FIG. 13 is a schematic cross-sectional view of a noodle strings steaming device used in Example 3 of Test example 2.

Further, in Example 3, as illustrated in FIG. 13, steam supply of 400 kg/h was performed only in the first half portion in a state in which a partition member was provided as in Example 2 and supply of the steam of the intermediate portion and the second half portion was stopped.

Figure 14:
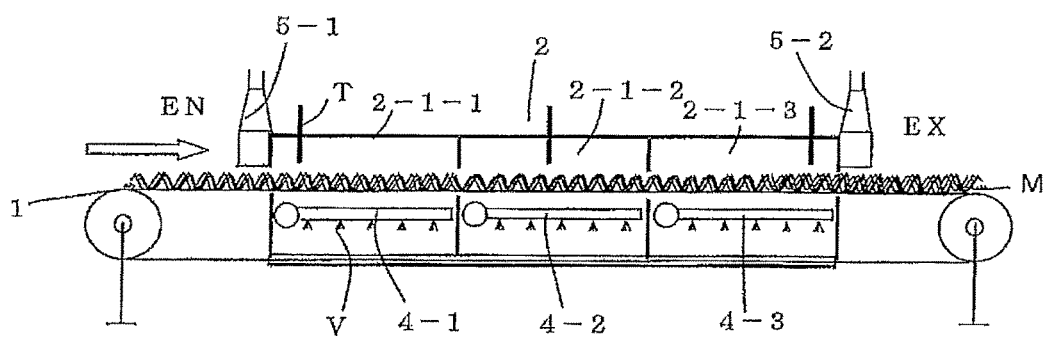
FIG. 14 is a schematic cross-sectional view of a noodle strings steaming device used in Comparative example 2 of Test example 2.

In Comparative example 2, as illustrated in FIG. 14, steam supply of 133 kg/h that was a flow amount of ⅓ of 400 kg/h of the steam flow amount in the first half portion of Example 3 was then performed in the first half portion, the intermediate portion, and the second half portion.

In Examples 2 and 3, an amount of air of the duct was adjusted so that temperatures indicated by a thermometer (for measurement of a temperature of a space on the noodle strings inside the reservoir) provided in the reservoir 10 cm from the entrance portion and a thermometer (for measurement of a temperature of a space on the noodle strings inside the reservoir) provided in the reservoir 10 cm from the exit portion were 98° C. or more. However, in Comparative example 2, the temperature increased only to 97° C. or less even after the duct was adjusted.

Some of the noodle strings after the steaming process under each condition of Conventional example 2, Example 2, Example 3 and Comparative example 2 described above were collected to measure the degree of gelatinization of the noodle strings at the same time and processed as shown in Test example 1 to complete an instant noodle mass, and a tasting test was performed. Further, for tasting, the noodle strings steamed under the conventional steaming condition (Conventional example 1) were used for control, and intensity of a steaming therefor was compared. The results are shown in Table 2.

TABLE 2

| | Amount of flow (kg/h) | | | | |
|---|---|---|---|---|---|
| | First half portion | Intermediate portion | Second half portion | Partition member | Tasting result |
| Conventional Example 2 | 400 | 400 | 400 | Absent | Good |
| Example 2 | 400 | 400 | — | Present | Good |
| Example 3 | 400 | — | — | Present | Good |
| Comparative example 2 | 133 | 133 | 133 | Present | Undercooked |

The tasting evaluation was able to be obtained in the case of performing the steaming only in the first half portion and the intermediate portion as shown in Example 2, the case of performing the steaming only in the first half portion, and the case of similarly performing the streaming in the first half portion, the intermediate portion and the second half portion as in Conventional example 2.

This result shows that the amount of steam can be greatly reduced in comparison with a conventional steam flow amount. Meanwhile, in the case in which steam supply was not concentrated in the steam supply portion (the first half portion) even when the total flow amount was the same as that in Example 3, the tasting evaluation did not reach that in Example 3, and the undercooked taste remained in the texture, as shown in Comparative example 2.

A method of steaming the noodle strings according to aspect 1 may be

"a method of steaming a bunch of noodle strings using a noodle strings steaming device including a conveyer on which the bunch of noodle strings is placed after being cut out and that transports the bunch of noodle strings, and a tunnel type of body portion provided so that the bunch of noodle strings passes through the body portion with the transportation of the conveyer, the method including:

"a process of carrying the cut-out bunch of noodle strings from an entrance portion of the body portion while transporting the cut-out bunch of noodle strings on the conveyer, steaming for a predetermined period of time, and then performing transportation to an exit portion in a state in which supply of the steam is stopped."

The method of steaming the noodle strings according to aspect 2 may be

"the method of steaming the noodle strings according to aspect 1, wherein an internal temperature of the entrance portion of the body portion is 98° C. or more and an internal temperature of the exit portion is maintained at 98° C. or more."

A noodle strings steaming device according to aspect 3 may be

"a noodle strings steaming device including a conveyer on which a bunch of noodle strings is placed after being cut out and that transports the bunch of noodle strings, and a tunnel type of body portion provided so that the bunch of noodle strings passes through the body portion with the transportation of the conveyer, "wherein the body portion includes a steam supply portion that supplies steam to the bunch of noodle strings transported on the conveyer from an entrance side; and a steam stop portion continuous to the steam supply portion, the supply of the steam being stopped in the steam stop portion."

The noodle strings steaming device according to aspect 4 may be

"the noodle strings steaming device according to aspect 3 further including an exhaust device installed near the entrance of the body portion of the noodle strings steaming device."

The noodle strings steaming device according to aspect 5 may be

"the noodle strings steaming device according to aspect 4, including an exhaust device installed near the exit of the body portion of the noodle strings steaming device."

The noodle strings steaming device according to aspect 6 may be "the noodle strings steaming device according to any one of aspects 3 to 5, including a partition member provided at a border between the steam supply portion and the steam stop portion."

REFERENCE SIGNS LIST

1 Conveyer
2 Body portion
   2-1 Steam supply portion
   2-2 Steam stop portion
3 Partition portion
   3-1 Partition member
   3-2 Lower partition member
   3-3 Upper partition member
4 Steam pipe
   4-1 First steam pipe
   4-2 Second steam pipe
   4-3 Third steam pipe
5 Duct
   5-1 First exhaust device (duct) (entrance side)
   5-2 Second exhaust device (duct) (exit side)
Body portion entrance portion EN
Body portion exit portion EX
Bunch of noodle strings
Steam V
Thermometer T

The invention claimed is:

1. A method of producing noodle strings using a noodle strings steaming device including a conveyer on which the bunch of noodle strings is placed after being cut out and that transports the bunch of noodle strings, and a tunnel type of body portion provided so that the bunch of noodle strings passes through the body portion with the transportation of the conveyer, the method comprising:

carrying the cut-out bunch of noodle strings from an entrance portion of the body portion while transporting the cut-out bunch of noodle strings on the conveyer to pass the bunch of noodle strings through a first portion provided on the entrance side of the body portion, wherein the first portion includes at least one steam supplier, supplying steam from the at least one steam supplier to the bunch of noodle strings in the first portion, steaming the bunch of noodle strings for a predetermined period of time in the first portion with the supplied steam to the bunch of noodle strings, transporting the bunch of noodle strings on the conveyer to pass the bunch of noodle strings through a second portion of the body portion, in which steam supply is halted and residual steam transported from the first portion is present in the second portion, wherein the second portion is provided on an exit side and continuous with the first portion, steaming the bunch of noodle strings in the second portion with the residual steam transported from the first portion, and transporting the bunch of noodle strings to an exit portion, wherein the time taken for the noodle string to enter the entrance portion of the body portion and then the exit portion is between 1 minute and 20 seconds to 2 minutes and 30 seconds wherein between $1/5$ to $4/5$ of the steaming process occurs in the first portion.

2. The method according to claim 1, wherein an internal temperature of the entrance portion of the body portion is 98° C. or more and an internal temperature of the exit portion is maintained at 98° C. or more.

3. The method according to claim 1, wherein the volume of the second portion is between $1/4$ and 4 times the volume of the first portion.

4. A method of producing noodle strings using a noodle strings steaming device including a conveyer on which the bunch of noodle strings is placed after being cut out and that transports the bunch of noodle strings, and a tunnel type of body portion provided so that the bunch of noodle strings passes through the body portion with the transportation of the conveyer, the method comprising:

carrying the cut-out bunch of noodle strings from an entrance portion of the body portion while transporting the cut-out bunch of noodle strings on the conveyer to pass the bunch of noodle strings through a first portion provided on the entrance side of the body portion, wherein the first portion includes at least one steam supplier, supplying steam from the at least one steam supplier to the bunch of noodle strings in the first portion, steaming the bunch of noodle strings for a predetermined period of time in the first portion with the supplied steam to the bunch of noodle strings, transporting the bunch of noodle strings on the conveyer to pass the bunch of noodle strings through a second portion of the body portion, wherein no steam is supplied from any steam supplier arranged in the second portion, and wherein steam transported from the first portion is present in the second portion, wherein the second portion is provided on an exit side and continuous with the first portion, steaming the bunch of noodle strings in the second portion with the steam transported from the first portion, and transporting the bunch of noodle strings to an exit portion, wherein the time taken for the noodle string to enter the entrance portion of the body portion and then the exit portion is between 1 minute and 20 seconds to 2 minutes and 30 seconds wherein between $1/5$ to $4/5$ of the steaming process occurs in the first portion.

5. The method according to claim 4, wherein the volume of the second portion is between $1/4$ and 4 times the volume of the first portion.

\* \* \* \* \*